United States Patent [19]

Pedley et al.

[11] Patent Number: 4,894,808
[45] Date of Patent: Jan. 16, 1990

[54] FLOW NOISE REDUCTION

[75] Inventors: Mark Pedley, Cambridge; William J. Fitzgerald, Madingley, both of England

[73] Assignee: The Marconi Company Limited, England

[21] Appl. No.: 359,220

[22] Filed: May 31, 1989

Related U.S. Application Data

[63] Continuation of Ser. No. 143,739, Jan. 13, 1988, abandoned.

[30] Foreign Application Priority Data

Jan. 16, 1987 [GB] United Kingdom ............... 8701067
Mar. 13, 1987 [GB] United Kingdom ............... 8706076

[51] Int. Cl.⁴ ............................ G01V 1/36; G01V 1/38
[52] U.S. Cl. ...................................... 367/21; 367/901; 367/131; 367/135; 367/24
[58] Field of Search ...................... 367/21, 22, 24, 141, 367/153, 154, 131, 135, 45, 191, 901, 902, 903

[56] References Cited

U.S. PATENT DOCUMENTS

| | | | |
|---|---|---|---|
| 3,290,645 | 12/1966 | Pavey, Jr. et al. | 367/24 |
| 4,296,487 | 10/1981 | Green | 367/169 |
| 4,388,711 | 6/1983 | Fay | 367/901 X |
| 4,437,175 | 3/1984 | Berni | 367/24 |
| 4,473,906 | 9/1984 | Warnaka et al. | 367/901 |
| 4,520,467 | 5/1985 | Berni | 367/24 |

Primary Examiner—Brian S. Steinberger
Attorney, Agent, or Firm—Kirschstein, Ottinger, Israel & Schiffmiller

[57] ABSTRACT

The level of signal noise caused by fluid flow at a pressure transducer, such as a hydrophone or geophone, is determined by measuring the electric field induced when the fluid flow through a magnetic field. The electric field, which is proportional to flow rate, is measured by electrodes positioned about the transducer. The pressure due to the flow is derived from the flow rate voltage by a digital filter which may be adaptive, to allow for varying flow conditions, or which may employ a predetermined electric field/flow noise relation. This flow noise is then subtracted from the received signal, the resultant signal then being substantially noise free.

5 Claims, 1 Drawing Sheet

FLOW NOISE REDUCTION

This is a continuation of application Ser. No. 07/143,739 filed Jan. 13, 1988 now abandoned.

BACKGROUND OF THE INVENTION

1. Field of the Invention

This invention relates to a method and apparatus for reducing signal noise at a pressure transducer which is caused by fluid flow.

2. Description of Related Art

Hydrophone transducers are used in, for example, sonar buoys and torpedo homing heads to detect a sonar signal by measuring pressure fluctuations. The performance of the transducer is hampered by noise caused by water flowing, generally turbulently, over the transducer. The noise caused by the flow pressure is broad band and rapidly fluctuating and is impossible to remove adequately by straightforward filtering. The same problem arises with microphones which are affected by air flow, and geophones sensitive to seismic vibrations which can also be affected by air flow.

SUMMARY OF THE INVENTION

An object of this invention is to reduce noise caused by fluid flow.

According to one aspect of the invention a method of reducing signal noise at an output from a pressure transducer caused by fluid flow includes the steps of deriving from the fluid flow velocity a signal indicative of the instantaneous pressure exerted at the transducer by the fluid flow, and using the derived signal to cancel output signal noise, caused by said fluid flow, from the transducer.

The signal indicative of the pressure is preferably continuously derived by an adaptive filter in such a way as to minimise the square of the difference between the derived signal and the transducer output signal. Alternatively, the signal may be derived using a fixed mapping between the flow rate and pressure. The fluid flow rate may be derived from the strength of the electric field induced by fluid flow perpendicular to a magnetic field in the region of the transducer. Means may be employed to provide the magnetic field or the earth's magnetic field may be used.

The flow velocity is preferably measured at a plurality of points in the region of the transducer.

According to another aspect of the invention an arrangement for reducing signal noise caused by fluid flow at a pressure transducer comprises a set of electrodes arranged to detect the electric field induced by fluid flow through a perpendicular magnetic field and means to derive from the strength of the electric field a signal indicative of the pressure exerted by said fluid flow. The arrangement may comprise means to provide the magnetic field. The set of electrodes may comprise two pairs of electrodes, each pair being spaced along a line perpendicular to the magnetic field and to the line between the other pair, so that the electric field induced by two perpendicular components of fluid flow is detectable.

BRIEF DESCRIPTION OF THE DRAWINGS

One embodiment of the invention will now be described by way of example, with reference to the accompanying drawings of which.

DETAILED DESCRIPTION OF THE PREFERRED EMBODIMENTS

Figure 1:
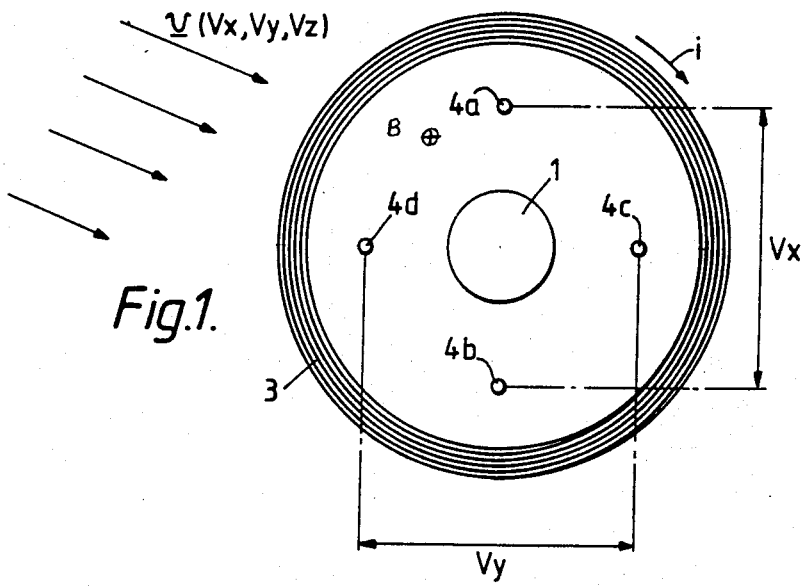
FIG. 1 shows a hydrophone transducer arrangement for measuring flow velocity in accordance with the invention.

Referring to FIG. 1, a hydrophone transducer 1 on, for example, a sonar buoy, is surrounded by a current-carrying coil 3. Four electrodes, in the form of metal dots, 4a, b, c, d are positioned symmetrically about the transducer 1 in the magnetic field B of the cylindrical coil, the electrodes being positioned around the centre of the coil. The hydrophone transducer is used to detect sonar signals emitted from a source by measuring the instantaneous pressure on its surface, but the signals are corrupted by noise caused by pressure fluctuations as water flows over the transducer.

As the water, which is conductive, flows through the magnetic field $\underline{B}$, an electric field is induced in the water. The strength, $\underline{E}$, of this electric field is given by $$\underline{E} = \underline{v} \times \underline{B}$$

where $\underline{v}$ is the fluid velocity. The arrangement thus comprises an electromagnetic flow meter. The velocity $\underline{v}$ is the relative velocity of the fluid and transducer. In many applications the transducer is dragged through the water and this clearly will give rise to noise in the same way as does fluid flowing over a stationary transducer. The four electrodes are arranged in two equally spaced pairs 4a,b and 4c,d so that the line between each pair lies perpendicular to the magnetic field and to the line between the other pair. The voltage measured across each pair is proportional to the electric field strength in the direction of alignment of the pair. Thus, $$V_x \propto B_z v_y$$

$$V_y \propto B_z v_x$$

since $B_x$, $B_y$ are zero, where $v_x$ and $v_y$ are velocity components in the co-ordinate directions x and y.

The transducer 1 detects the instantaneous pressure caused by a sonar signal received from a source or reflected from a target and corrupted by flow pressure and the total pressure signal is converted by the transducer to a voltage s+n where s is the voltage representing the uncorrupted sonar signal pressure and n represents any noise in that signal. As will be seen, the transducer output voltage s+n is combined with the flow voltages $V_x, V_y$ in such a way as to minimise the flow noise content of the signal s+n. The physical flow of fluid over the transducer is necessarily correlated with the noise it produces. In a simple case of steady flow, for instance, the relationship between flow pressure P and fluid velocity v is given by Bernoulli's equation:

$$P \propto \tfrac{1}{2} v^2$$

Thus $SP \propto vSv$

Figure 2:
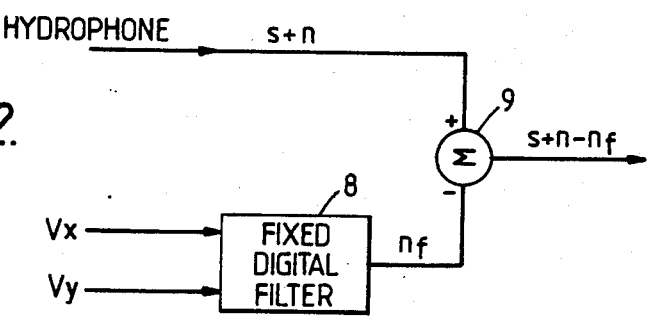
FIGS. 2 and 3 show filter arrangements suitable for use with the invention.

The relation would not generally be so simple, but provided the mapping of pressure to flow is known it can be implemented as a digital filter to be used as shown in FIG. 2. Inputs to the filter 8 are the voltages $V_x$, $V_y$ representing the flow velocity components $v_y$, $v_x$ respectively. The voltages are operated upon by the filter according to the pre-set mapping, to produce an output $n_f$ representing flow pressure. This output $n_f$ is subtracted from the received signal s+n, at adder 9, to give a resultant output $(s+n-n_f)$.

The signal s in fact also causes water oscillation at its signal frequency, since it is a travelling compressive wave. However it can be shown that, at low Mach numbers, this flow is negligible and will not be detected.

The mapping to be implemented by the filter can be obtained by mathematical modelling, or from experimental data. It must take account of both the relationship between the flow velocity and the transducer and the relationship between the flow voltages and the magnetic field. For flows for which the mapping is perfect, the filter output $n_f$ will equal the noise n. In general however a fixed mapping can only be an approximation and for very non-steady flow it is unlikely that any fixed filter would give satisfactory noise reduction. In such cases, a better result can be obtained by using an adaptive system which can continually adapt itself to implement the optimum mapping, given the instantaneous flow conditions. Such a system can cope accurately with rapidly fluctuating conditions, and it also relieves the user of the necessity to determine a good fixed mapping.

Figure 3:
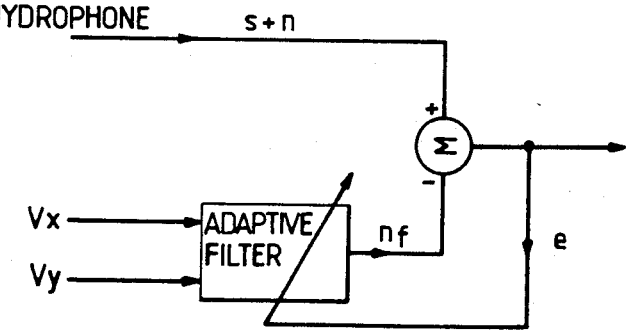

FIG. 3 shows in outline an adaptive filter system. The inputs to the system are again the received signal s+n, and the voltages $V_x$, $V_y$. The adaptive filter 'learns' the optimum maping by adapting to minimise the difference between the hydrophone signal s+n and the flow noise $n_f$. The system output e serves as the error signal which is fed back to the filter. Because the filter 'learns' the best mapping while it processes, no prior knowledge of s, n or $n_f$, or of their interrelationship, is required.

The output is given by $$e = s + n - n_f$$

The squared error is therefore $$e^2 = s^2 + (n - n_f)^2 + 2s(n - n_f)$$

Taking expectations:

$$E[e^2] = E[s^2] + E[(n-n_f)^2] + 2E[s(n-n_f)]$$

Since s is uncorrelated with n and $n_f$, $$E[e^2] = E[s^2] + E[(n-n_f)^2]$$

The signal power s is unaffected by the filter, so if the filter acts to minimise $E[e^2]$, its output $n_f$ must be the best estimate of the signal noise n, and the system output e must therefore be the best estimate of the pure signal.

In practice the system output e will contain some noise, but the signal to noise ratio is greatly improved.

For a more accurate representation of the flow, the transducer is surrounded by a network of electromagnetic flow meters. The distribution and density of the electrodes is chosen according to the complexity of the flow.

While electromagetic flow meters are particularly suitable for use with hydrophones, the invention, which is equally applicable to other transducer types, such as microphones and geophones, includes within its scope the use of other types of flow meter.

We claim:

1. A method of reducing noise in the output signal of a pressure transducer, where the noise is caused by fluid flowing over the transducer, comprising the steps of:
   (a) generating a pressure transducer output signal comprising both a wanted signal representative of an input acoustic signal to be detected, and an unwanted noise signal representative of fluid flow noise detected by said transducer;
   (b) generating a fluid velocity noise signal representing the fluid velocity immediately adjacent said pressure transducer by providing a set of electrodes comprising two pairs of electrodes, each pair being spaced along a line perpendicular to a magnetic field, the line of one pair being perpendicular to the line of the other pair, so that the electric field induced by two perpendicular components of fluid flow is detectable;
   (c) applying said fluid velocity noise signal to an adaptive filter to produce a corresponding fluid pressure noise signal according to an adaptive characteristic of said adaptive filter;
   (d) subtracting said fluid pressure noise signal from said pressure transducer output signal to produce said wanted signal; and
   (e) controlling said adaptive filter characteristic in dependence upon said wanted signal to minimize the error between said unwanted noise signal and said fluid pressure noise signal.

2. A method according to claim 1, including the step of employing a magnetic field transverse to the direction of fluid flow to induce an electric field in the fluid, and the further step of detecting said electric field to provide said first signal.

3. A method according to claim 1, wherein said fluid flow velocity is determined at a plurality of points adjacent the transducer where said fluid flow contributes substantially to said noise.

4. An arrangement for reducing noise in the output signal of a pressure transducer, where the noise is caused by the pressure of fluid flowing over the transducer, comprising:
   (a) a pressure transducer disposed in a magnetic field;
   (b) a set of electrodes immediately surrounding said pressure transducer for detecting an electric field induced by fluid flow through said magnetic field;
   (c) means for deriving from said electric field a fluid velocity noise signal indicative of said pressure exerted on said transducer by fluid flow;
   (d) means for subtracting said fluid velocity noise signal from said output signal; and
   (e) wherein said set of electrodes comprises two pairs of electrodes, each pair being spaced along a line perpendicular to said magnetic field, the line of one pair being perpendicular to the line of the other pair, so that the electric field induced by two perpendicular components of fluid flow is detectable.

5. An arrangement according to claim 4, wherein said pressure transducer is a hydrophone.

* * * * *